(12) United States Patent
Kohlmeier-Beckmann et al.

(10) Patent No.: US 7,150,548 B2
(45) Date of Patent: Dec. 19, 2006

(54) READING LAMP FOR AIRCRAFT CABINS

(75) Inventors: Carsten Kohlmeier-Beckmann, Buxtehude (DE); Detlef Heym, Achim (DE)

(73) Assignee: Airbus Deutschland GmbH, Hamburg (DE)

( * ) Notice: Subject to any disclaimer, the term of this patent is extended or adjusted under 35 U.S.C. 154(b) by 207 days.

(21) Appl. No.: 10/783,949

(22) Filed: Feb. 19, 2004

(65) Prior Publication Data

US 2004/0213005 A1 Oct. 28, 2004

(30) Foreign Application Priority Data

Feb. 20, 2003 (DE) ................. 103 07 147

(51) Int. Cl.
 *B64D 47/02* (2006.01)
 *F21V 21/00* (2006.01)
(52) U.S. Cl. ............... 362/471; 362/483; 362/514
(58) Field of Classification Search ........... 362/283, 362/284, 324, 470, 471, 487, 488, 490, 493, 362/504, 548, 549, 478, 479, 483, 485, 514
See application file for complete search history.

(56) References Cited

U.S. PATENT DOCUMENTS

| | | | | | |
|---|---|---|---|---|---|
| 963,036 | A | * | 7/1910 | Zeng | .......... 362/139 |
| 1,201,350 | A | * | 10/1916 | Royce | .......... 362/105 |
| 2,517,422 | A | * | 8/1950 | Gellman | .......... 362/139 |
| 2,539,104 | A | * | 1/1951 | Rodel | .......... 362/105 |
| 5,519,797 | A | | 5/1996 | Chambaret et al. | |
| 6,685,347 | B1 | * | 2/2004 | Grutze | .......... 362/487 |

FOREIGN PATENT DOCUMENTS

| | | |
|---|---|---|
| DE | 299 19 032 | 12/1999 |
| DE | 199 07 815 | 8/2000 |
| DE | 100 52 862 | 5/2002 |
| EP | 0 633 424 | 1/1995 |
| WO | WO01/02775 | 1/2001 |

\* cited by examiner

Primary Examiner—Y. My Quach-Lee
(74) Attorney, Agent, or Firm—W. F. Fasse; W. G. Fasse

(57) ABSTRACT

A reading lamp for an aircraft cabin, particularly installed above a passenger seat, has a light source emitting a light beam with an optical axis extending substantially horizontally so that a light beam can be deflected by an optical deflector such as a mirror, to a passenger seat. This orientation of the light source provides a compact construction of the reading lamp. Preferably the deflector position is adjustable relative to the optical axis.

21 Claims, 4 Drawing Sheets

READING LAMP FOR AIRCRAFT CABINS

PRIORITY CLAIM

This application is based on and claims the priority under 35 U.S.C. §119 of German Patent Application 103 07 147.4, filed on Feb. 20, 2003, the entire disclosure of which is incorporated herein by reference.

FIELD OF THE INVENTION

The invention relates to a reading lamp (also generally called a reading light) for a passenger cabin, particularly in an aircraft. Such reading lights are normally installed above a passenger seat and include at least one light source, preferably of the LED type or of a miniature halogen type.

BACKGROUND INFORMATION

Modern passenger aircraft cabins are equipped with reading lamps or lights installed above each passenger seat in the ceiling area. Such lamps provide an individually switchable or controllable illumination for the passenger seated in the respective passenger seat area. It is typical for such lamps to use either light emitting diodes or miniature halogen lamps as the light source. Generally, the number of reading lamps in a group will depend on the number of seats. Thus, groups of two to five reading lamps are used.

Due to the geometric space availability in the overhead or ceiling area of the aircraft cabin and due to the required flexibility of the chair positioning layout it is necessary that these reading lamps can be adjusted in a relatively wide range so that even if the lamps remain stationary in the overhead area, the seating rows can be shifted back and forth as required for any particular layout. However, for making conventional lamps adjustable so that their light output can be directed to various seat row positions, a substantial installation volume is required in the overhead area, due to the desired small light exit area because for this purpose the tilting axes for the adjustment of the light direction cannot be located in the geometric center of gravity of the particular reading lamp. Rather, the tilting axis needs to be located very close to the light exit or front face or cover of the reading lamp, which makes the adjustment more difficult.

While it is desirable that each passenger should be able to individually adjust the reading lamp or light allocated to his seat, this is frequently not possible due to the constructive layout of the overhead supply channel in which these reading lamps or lights are installed. Thus, providing each individual passenger with the comfort of being able to adjust the respective reading lamp is frequently not realizable with conventional reading lights.

The electrical power supply for the reading lamps is frequently accomplished with so-called pre-stages which, on the one hand supply the electrical energy which is processed to provide the required voltage or wattage for the individual lamps. On the other hand, these pre-stages also provide a connection to a databus system of the aircraft for centrally controlling and monitoring the reading lights or lamps. These pre-stages are conventionally also used for the activation and control of other components also housed in the supply channel, for example for loudspeakers, for various notifications such as nonsmoking indicators, fastening seat belts indicators and the like. The electrical connection between the pre-stages and the reading lamps is accomplished by individual cable bundles due to the movable mounting of the conventional reading lamps.

OBJECTS OF THE INVENTION

In view of the foregoing it is the aim of the invention to achieve the following objects singly or in combination:

- to construct a reading lamp or light for an aircraft cabin in such a way that it requires an optimally small installation volume in the overhead area of an aircraft cabin, particularly in the supply channel;
- to provide the installed reading lamp with an adjustment that permits directing an individual light beam by a passenger and/or by flight personnel, preferably by a remote control;
- to assure that the position adjustments of the light direction can be made with reference to individual passenger seats even if these seats change position for different layouts; and
- to construct a reading lamp in such a way that the direction of a light beam emanating from a light source in the reading lamp can be adjusted without adjusting the position of the lamp itself.

SUMMARY OF THE INVENTION

The above objects have been achieved according to the invention by a light projecting reading lamp having a horizontally oriented optical axis along which the light from a light source passes onto an optical deflector which deflects the light at an adjustable angle to the optical axis by a position adjustment of the optical deflector in a relative wide angular range toward the seating area of the respective passenger seat. The adjustment of the deflector position can be made by a passenger and/or by a flight attendant preferably by remote control. An adjustment once made could be permanent, if desired for particular purposes.

Advantages of the reading light construction according to the invention are seen in the low structural height of the entire lamp due to the horizontal orientation of its optical axis which may extend either parallel to an aircraft longitudinal axis or perpendicularly thereto or even at an angle while always retaining its substantially horizontal position. Minor deviations from the horizontal position of the optical axis may be dictated by the space availability in the overhead area particularly the supply channel area of the aircraft cabin. Further, the present reading light has a small space requirement which facilitates its installation with the preferred horizontal orientation of its optical axis.

Another advantage is seen in the individual adjustability of the reading light direction by its user preferably by remote control. For example, according to a further embodiment of the invention a motor driven individual adjustment is provided for adjusting the optical deflector, such as a mirror. For this purpose at least one, preferably two electrical drives are provided for adjusting the reflector mirror about two axes which extend preferably perpendicularly to each other. Particularly, this embodiment is amenable to a remote control, whereby a remote control switch may be installed in the armrest of a passenger seat for operating a remote control unit to provide control signals to the deflector drives to move right or left or up or down. The adjustment of the optical deflector such as a mirror in two directions or about two axes makes the present lamp compatible with different seating layouts in the cabin.

Further, a remote and automatic control of the adjustment of the reading light direction according to the invention can now be performed in accordance with a predetermined layout of the positions of the respective passenger seats. In this embodiment so-called correlation tables are established which define the positional relationship between a passenger seat to be served by the respective reading lamp and an optimal direction of the light emanating from the reading lamp relative to any particular preadjusted seat position such as a sitting position or a reclining position. Here again an automatic adjustment of the proper light direction can take place by remote control or by a central control.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
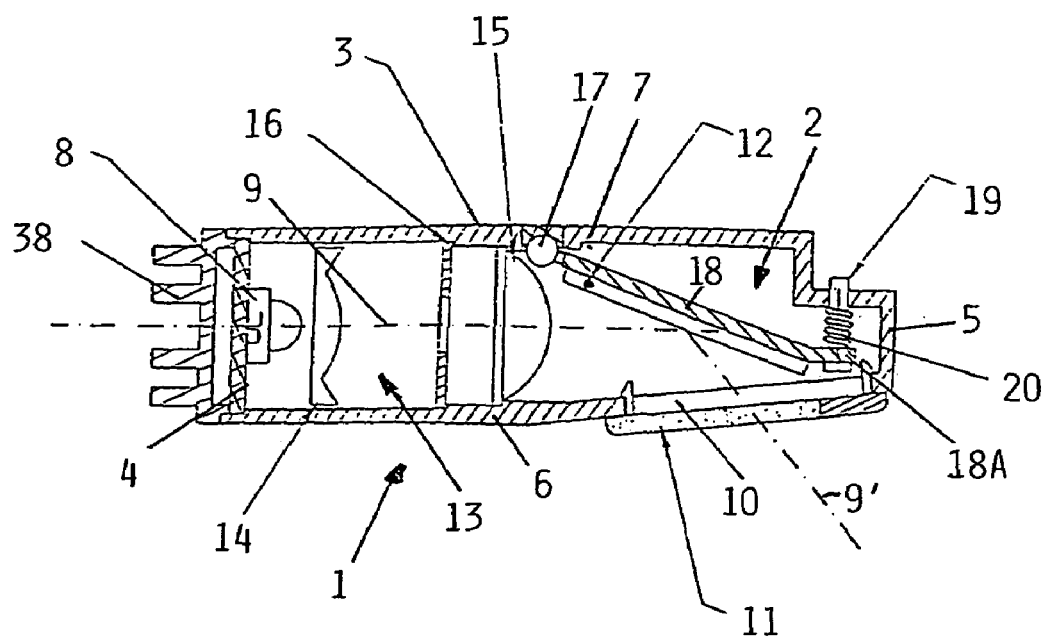
FIG. 1 is a sectional view through a reading lamp according to the invention with the section plane extending through the longitudinal optical axis of the lamp, whereby the optical axis extends horizontally in an aircraft cabin, and wherein the mounting element of the lamp is an enclosing housing.

FIG. 1 shows a reading lamp 1 having an adjustable optical deflector 2 secured in a mounting element 3 in the form of a housing as shown. Alternatively, the mounting element 3 could be a mounting bracket, a mounting support or a mounting plate, or the like. The housing 3 preferably has a rectangular or square cross section with a longitudinal housing axis that preferably coincides with an optical axis 9 of a light source 8 that is secured to a first end 4 of the housing 3. The optical axis 9 extends toward an opposite end 5 of the housing 3. Longitudinal side walls 6 and 7 complete the housing 3. When the reading lamp 1 is installed in the overhead area of an aircraft cabin, the optical axis 9 extends substantially horizontally as explained above. In the area next to the opposite housing end 5, the side wall 6 is provided with a light exit opening 10. This exit opening 10 is preferably closed by a transparent cover 11 such as a plane pane or a converging lens. The optical deflector 2 is adjustably mounted in the end area next to the opposite end 5 for deflecting light through the exit opening 10 at an angle to the optical axis 9 as indicated by the dashed line 9'. According to the invention the exit angle is adjustable by adjusting the position of the optical deflector 2. However, the angle may also be fixed after an initial adjustment of the deflector 2, if desired. The deflector 2 preferably comprises a mirror 12 mounted to a carrier plate 18 in a position for deflecting a light beam in the direction 9' toward a passenger seat, not shown.

Optical elements of an optical system are mounted in the housing 3 between the light source 8 and the deflecting mirror 12. These optical elements comprise a focusing lens 14, an aperture 16 and a converging lens 15 centered relative to the optical axis 9 for directing a light beam toward the deflecting mirror 12. The mirror 12 may be replaced by an angular prism functioning as an optical deflecting device 2. Any one of a number of suitable deflecting devices can be used. The mounting permits a position adjustment according to the invention, regardless whether the deflector is a mirror, a prism or the like.

FIG. 1 further shows that the mirror 12 or rather its mounting plate 18 is hinged with one of its edges to a hinge 17 mounted to the housing wall 7 so that the mirror 12 faces the exit opening 10. A plate edge 18A positioned opposite to the hinged edge of the plate 18 is angled for conveniently securing an adjustment screw 19 to the angled plate edge 18A of the mirror carrier plate 18. A threaded end of the adjustment screw 19 extends through a threaded hole in the housing 3 near the opposite housing end 5. The end of the screw extending out of the housing 3 can be made accessible for a manual adjustment, for example with a screwdriver. For this purpose the screw 19 is rotatably mounted in the plate edge 18A. A compression spring 20 surrounds the adjustment screw 19 between an inner wall surface of the housing 3 and the angled plate edge 18A of the mirror carrier plate 18. Thus, the compression spring 20 will hold the mirror in an adjusted position. FIG. 1 further shows that the first end 4 of the housing 3 is equipped with cooling fins 38. Preferably, the first housing end 4 and the cooling fins 38 form a separate component that is insertable into an open first housing end for an easy exchange of the light source 8 such as a light emitting diode or a miniature halogen light source.

Figure 2:
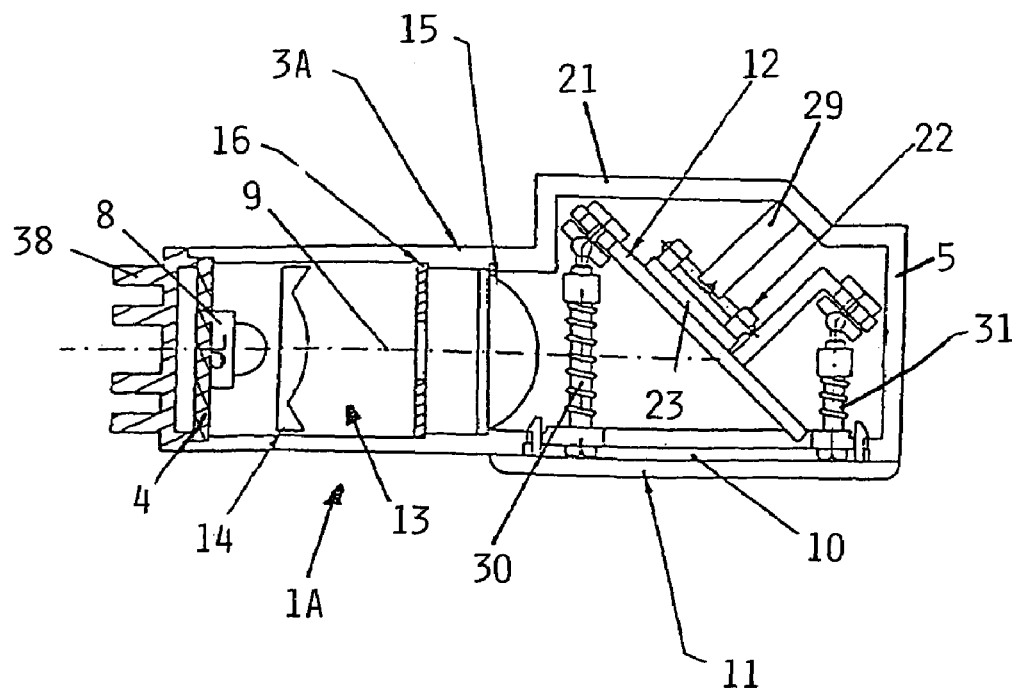
FIG. 2 is a view similar to that of FIG. 1, however showing a modified mounting element in the form of a housing that accommodates a Cardanic suspension for the adjustment of the optical light deflector.
Figure 3:
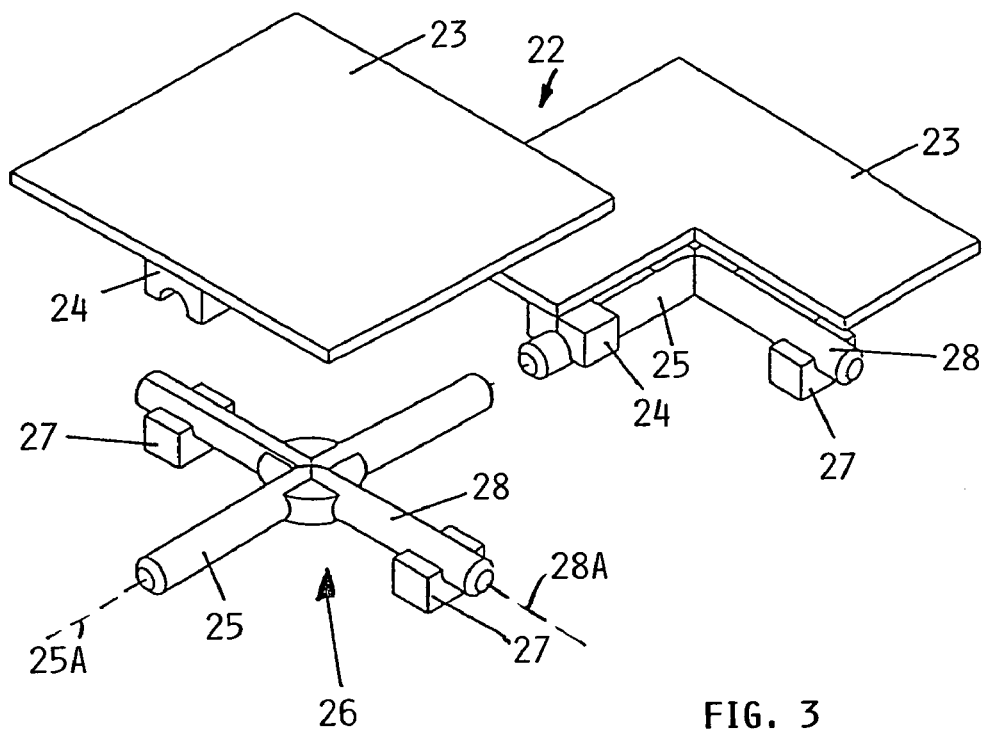
FIG. 3 illustrates in an exploded perspective view the details of the Cardanic suspension shown in FIG. 2.

FIGS. 2 and 3 show a second embodiment 1A of the present reading lamp. The embodiment 1A of FIGS. 2 and 3 is constructed substantially as the lamp 1 of FIG. 1 at least as far as the optical features are concerned. However, the housing 3A in FIGS. 2 and 3 comprises an enlarged housing section 21 in the area of the opposite housing end 5 for accommodating a different adjustment mechanism for adjusting the position of the deflector mirror 12. The deflecting mirror 12 is adjustably mounted by a Cardanic suspension 22 in the housing portion 21. A mirror carrier plate 23 is secured to the Cardanic suspension, which in turn is attached to the wall of the housing portion 21 by a bracket 29. As shown in FIG. 3, the mirror carrier plate 23 of the Cardanic suspension 22 has two bearings 24, only one such bearing 24 is visible in FIG. 3. The Cardanic suspension comprises a Cardanic cross 26 having two axles 25 and 28 crossing each other at a right angle. The bearings 24 cooperate with the axle 25 of the Cardanic cross 26. Further bearings 27 secured to the mounting bracket 29 cooperate with the axle 28 and hold the carrier plate 23 adjustably in place. For this purpose the axle 28 of the Cardanic cross 26 is rotatable in the bearing 27 about the axis 28A. The axle 25 which is rigidly secured to the axle 28, tilts with the axle 28 and so does the carrier plate 23 which is secured to the axle 25 by the bearings 24 thus permitting the carrier plate 23 to also tilt around the axle 25. As shown in FIG. 2, the adjustment of the mirror 12 is accomplished by two adjustment screws 30 and 31, whereby the mirror can be tilted about the axis 25A of the axle 25 and/or about the axis 28A of the axle 28. The ends of the adjustment screws 30 and 31 are secured to the mirror mounting by ball and socket supports which permit the movement of the mirror 12 relative to the axes 25A and 28A. Preferably, each adjustment screw 30, 31 is also equipped with a respective compression spring to keep the screws in an adjusted position. A ball and socket bearing secures the top end of the screw 30 to the carrier plate 23 for tilting about the axis 25A. Another ball and socket bearing secures the top end of the screw 31 through a lever to the plate 23 for tilting about the axis 28A.

Figure 4:
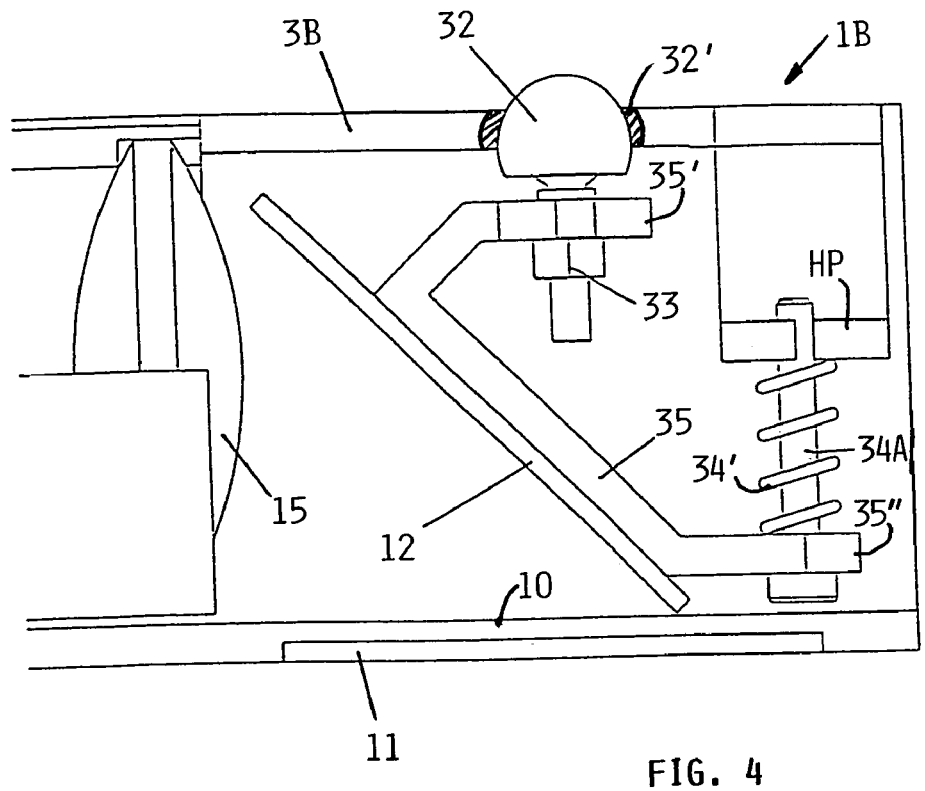
FIG. 4 is a side view of an optical deflector mounting constructed as a three point support.
Figure 5:
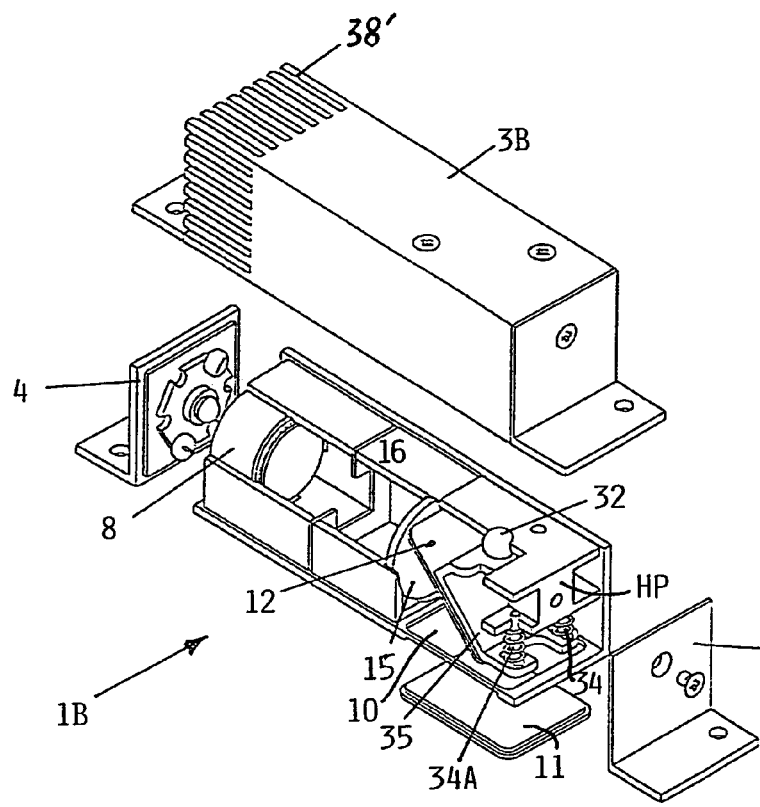
FIG. 5 is an exploded view of a reading lamp to show the three support points of the deflector mounting shown in the side view of FIG. 4.

FIGS. 4 and 5 show another embodiment 1B of the present reading lamps. The optical part of the lamp 1B is the same as in FIGS. 1 and 2, however, the adjustment for the deflection mirror 12 includes a three point support shown in FIGS. 4 and 5. The three point mounting comprises a mounting bracket 35 to which the deflection mirror 12 is secured. An upper end 35' of the mounting bracket 35 is secured to a ball 32 and socket 32' bearing, for example by a screw and nut 33. The ball 32 is mounted in a respective socket 32' in the sidewall of the housing 3B. The lower end 35" of the bracket 35 is secured to a housing or mounting portion HP by two adjustment screws 34 and 34A. Only the adjustment screw 34A is seen in FIG. 4. Both adjustment screws 34 and 34A are seen in FIG. 5. The ball and socket bearing 32, 32' and the two adjustment screws 34 and 34A form the three point mounting for the deflection mirror 12 which thus can be adjusted in two directions. Each of the adjustment screws 34 and 34A is rotatable in the bracket 35 and accessible for adjustment, for example by a motor shaft or by two motor shafts mounted in the housing portion HP. These adjustment motors are not shown. Preferably the adjustment screws 34 and 34A are also cooperating with compression springs 34' for maintaining an adjusted position. One compression screw is visible in FIG. 4. As shown in FIG. 5, the housing 3B is equipped with cooling slots 38' instead of the cooling fins 38 shown in FIGS. 1 and 2. All components that are the same in all embodiments are provided with the same reference characters.

Figure 6:
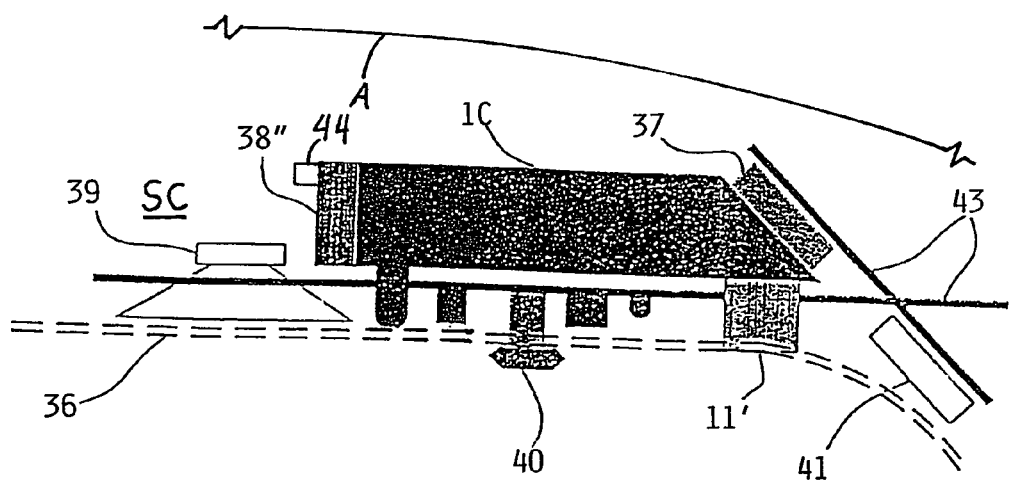
FIG. 6 illustrates a side view of a reading lamp according to the invention installed in a supply channel of an aircraft cabin.
Figure 6:
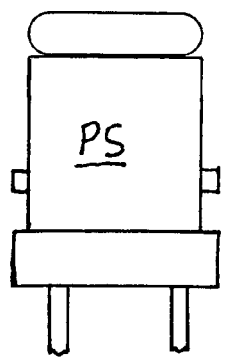

FIG. 6 illustrates an embodiment in which the reading lamp 1C according to the invention is installed with its housing in a supply channel SC of an aircraft A above a passenger seat PS in the aircraft cabin AC. FIG. 6 only shows a downwardly facing cover panel 36 of the supply channel. The light exit cover 11' is installed in the panel 36. A mirror drive 37 and cooling elements 38" are symbolically shown in FIG. 6. The components such as the lamp 1C, the mirror drive 37, a nonsmoking sign 41, a flight attendant calling button and indicator 40 are mounted to support plates or brackets 43 in the supply channel. A loudspeaker 39 is also mounted to the respective support plate 43. Preferably, the just mentioned components are assembled with the reading lamp 16 in a block to form a fully integrated modular unit of all electrical and electronic structural components including a pre-stage for the electrical supply and control. To avoid cable or wire connections directly to the modular unit the modular units are provided with respective electrical plug-in elements 44 thereby avoiding the multitude of cable or wire connections directly to the individual components of the modular unit.

As mentioned above, the cover plate for the light exit opening 10 may be a lens 11' and the deflection mirror 12 may be mounted in a fixed, permanently adjusted position. These fixed lamp positions may be advantageous for certain types of aircraft particularly smaller passenger aircraft where the seating layout is normally not changed.

Figure 7:
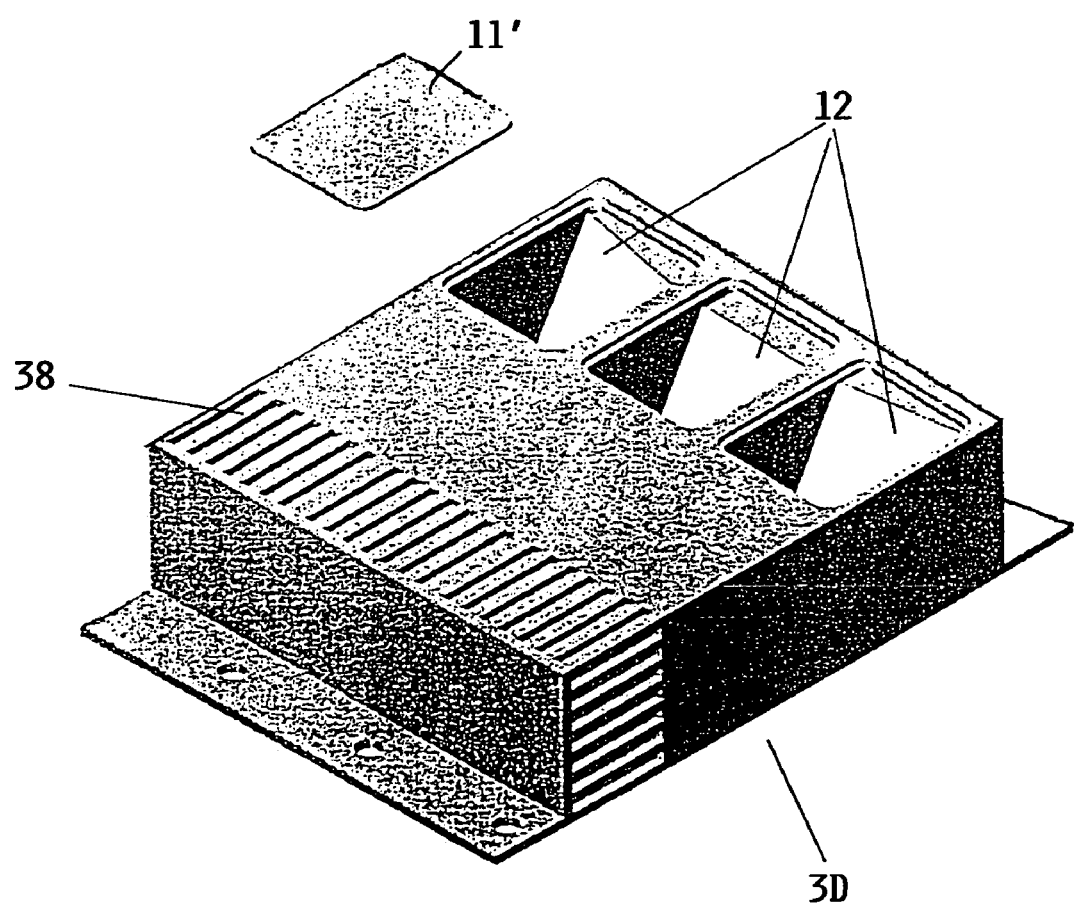
FIG. 7 illustrates a perspective view of three reading lamps with their respective deflector mirrors installed in a common housing.

FIG. 7 shows a housing 3D constructed for accommodating three lamps with the components described above. Three mirrors 12 are shown in FIG. 7. These mirrors are individually adjustable as described. By arranging three individual lamps in a common housing or in a common mounting element, the construction becomes optimally compact for saving space in the supply channel.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A reading lamp for an aircraft cabin, comprising a mounting element (3), at least one light source (8) secured to said mounting element, an optical system arranged and adapted to project light emanating from said light source (8) along an optical axis (9) extending horizontally in an installed position of said reading lamp, and an optical deflector (2, 12) that is secured to said mounting element in a position on said optical axis so as to deflect said light from said optical system at a deflection angle away from said optical axis (9) toward a passenger seat in the aircraft cabin, wherein said optical system (13) is positioned along said optical axis (9) between said light source (8) and said optical deflector (2, 12) and comprises a focusing lens (14), a converging lens (15), and an aperture (16) positioned between said focusing lens (14) and said converging lens (15).

2. The reading lamp of claim 1, wherein said mounting element is an elongated housing (3) having a first housing end (4) and a second housing end (5) opposite said first housing end (4), said light source (8) is secured to said first housing end so as to be adapted to project said light along said optical axis (9) toward said second housing end (5), said housing has a light exit (10) in an area of said second end (5), and said optical deflector (2, 12) is positioned in said housing in said area of said second end so as to be adapted to deflect said light through said light exit (10) out of said housing (3) at said angle away from said optical axis (9).

3. The reading lamp of claim 2, wherein said elongated housing has one of a square cross-section and a rectangular cross-section, and said elongated housing has an elongated housing axis coinciding with said optical axis (9).

4. The reading lamp of claim 2, further comprising a light transparent cover (11) closing said light exit (10).

5. The reading lamp of claim 4, wherein said light transparent cover (11) is a converging lens.

6. The reading lamp of claim 1, wherein said optical deflector (2) comprises a mirror (12).

7. The reading lamp of claim 1, wherein said optical deflector (2) comprises an angle prism.

8. The reading lamp of claim 1, further comprising a tiltable mounting (17) that tiltably secures said optical deflector to said mounting element and enables adjusting said deflection angle.

9. The reading lamp of claim 1, further comprising a hinge (17) secured to said mounting element (3), and wherein said optical deflector is tiltably secured to said hinge opposite a light exit (10) through which light passes thereby forming said deflection angle with said optical axis (9).

10. The reading lamp of claim 9, wherein said optical deflector comprises a mirror (12) and a mirror carrier plate (18) to which said mirror is secured, said mirror carrier plate (18) having an edge hinged to said hinge (17) and an opposite angled edge (18*a*), said reading lamp further comprising a deflection angle adjustment including at least one threaded member (19) passing through a threaded hole in said mounting element, said at least one threaded member having an end rotatably secured to said angled edge (18a) of said mirror carrier plate (18), said adjustment further comprising a compression spring (20) operatively interposed between said mounting element (3) and said mirror carrier plate (18).

11. The reading lamp of claim 1, further comprising a three point mounting that adjustably secures said optical deflector in said mounting element, said three point mounting comprising a rotational bearing (32) supported by said mounting element and two adjustable bearings including adjustment screws (33, 34) supported by said mounting element (3, 21).

12. The reading lamp of claim 1, further comprising a Cardanic suspension (22) that supports said optical deflector (12) in said mounting element (3) and a frictional brake that enables individual adjustment of said position of said optical deflector relative to said optical axis (9) about at least two adjustment axes (25A, 28A).

13. The reading lamp of claim 12, wherein said Cardanic suspension comprises a plate (23) carrying said optical deflector (12) and a Cardancross (26) including two bearings (24) securing said plate (23) to said Cardancross (26) and a bracket (29) securing said Cardancross (26) to said mounting element (3) through two further bearings (27) so that said optical deflector is adjustable about said two adjustment axes relative to said optical axis (9).

14. The reading lamp of claim 13, further comprising two adjustment screws (30, 31) operatively interposed between said mounting element (3) and said optical deflector (12) so as to enable said optical deflector to be adjusted about said two adjustment axes (25A, 28A), and further including two compression springs positioned to hold said optical deflector (12) in an adjusted position.

15. The reading lamp of claim 1, further comprising an electrical drive operatively connected to said optical deflector (12) and adapted to adjust said optical deflector (12) in two directions about two respective axes relative to said optical axis (9) so as to vary said deflection angle.

16. The reading lamp of claim 15, further comprising a remote control mechanism mounted in an armrest of the passenger seat and operatively connected to said electrical drive for adjusting said optical deflector (12).

17. The reading lamp of claim 1, further comprising an electrical drive operatively connected to said optical deflector and an automatic remote control operatively connected to said electrical drive for adjusting the position of said optical deflector (12) in response to a preset position of said passenger seat.

18. The reading lamp of claim 1, comprising electrical and electronic components integrated with said reading lamp into a modular block unit including at least one electrical plug-in element for avoiding direct cable connections individually to said components.

19. The reading lamp of claim 1, wherein said optical deflector is a deflector mirror (12) mounted in a fixed position in said mounting element (3).

20. An arrangement comprising an aircraft cabin in a passenger transport aircraft, a passenger seat installed in said aircraft cabin, and a passenger reading light unit installed in said aircraft cabin above said passenger seat, wherein said passenger reading light unit comprises:
   a housing;
   a light source arranged in said housing proximate to a first end of said housing;
   an optical deflector arranged in said housing proximate to a second end of said housing;
   a light outlet providing a light passage out of said housing adjacent to said optical deflector; and
   an optical system including at least one lens arranged in said housing between said light source and said optical deflector so as to be adapted to project light from said light source along an optical axis to said optical deflector;
   wherein:
   said passenger reading light unit is configured and arranged in said aircraft cabin above said passenger seat so that said optical axis extends in a plane parallel to a longitudinal axis of said aircraft cabin in said aircraft; and
   said optical deflector is adjustably arranged in said housing with an adjustable deflector position so as to deflect said light from said optical axis at an adjustable deflection angle downwardly through said light outlet toward and onto said passenger seat.

21. The arrangement according to claim 20, wherein said optical system is positioned along said optical axis between said light source and said optical deflector and comprises a focusing lens, a converging lens and a constricted aperture positioned between said focusing lens and said converging lens.

* * * * *